United States Patent

Yu C.

[11] Patent Number: 5,546,287
[45] Date of Patent: Aug. 13, 1996

[54] SETTING ANGLE ADJUSTER FOR THE CAR HEADLAMP

[76] Inventor: Lin Yu C., No. 477, Chung Shan N. Rd., Yung Kang City, Tainan Hsien, Taiwan

[21] Appl. No.: 506,475

[22] Filed: Jul. 25, 1995

[51] Int. Cl.$^6$ ............................................. B60Q 1/06
[52] U.S. Cl. .................... 362/66; 362/273; 362/424
[58] Field of Search .................... 362/61, 66, 80, 362/69, 270, 273, 420, 422, 427, 428, 430, 424, 421; 74/89.13, 89.15, 606 R

[56] References Cited

U.S. PATENT DOCUMENTS

| | | | |
|---|---|---|---|
| 4,893,219 | 1/1990 | Lisak | 362/66 |
| 5,161,877 | 11/1992 | Wright | 362/66 |
| 5,321,590 | 6/1994 | Wu | 362/66 |

*Primary Examiner*—James C. Yeung
*Attorney, Agent, or Firm*—Morton J. Rosenberg; David I. Klein

[57] ABSTRACT

An angle adjuster for a car headlamp is provided. The adjuster includes an adjuster stand having two crossed gear holders, a vertical gear holder and a crosswise gear holder. A driving gear with an integrally formed adjusting rod is disposed in the vertical gear holder and a threaded sleeve coupled to an active gear is disposed in the crosswise gear holder. A circular toothed groove is formed along the circumferential edge of the active gear to be driven by the driving gear. The two openings defined by the holders are each covered by a respective one of two slip caps. One end of a bolt is engaged with the threads of the threaded sleeve, and the other end is connected to the body of a headlamp. The screwing in or out of the bolt responsive to rotation of the adjusting rod drives the headlamp to change its tilt, the changed angle being set exactly in a simple and easy manner.

1 Claim, 4 Drawing Sheets

SETTING ANGLE ADJUSTER FOR THE CAR HEADLAMP

BACKGROUND OF THE INVENTION

FIELD OF THE INVENTION

The present invention relates to a setting angle adjuster for car headlamps. More particularly, the present invention is directed to an adjuster utilizing a pair of gears to set the inclination of a headlamp easily and accurately.

PRIOR ART

In accordance with the general purpose of car headlamps in providing lighting, and meeting that purpose for different vehicles, at different azimuths and inclinations, the car headlamp should be adjustable and fixable in the adjusted position. Referring to FIG. 4, there is shown, a conventional setting angle adjuster for a car headlamp. Such a prior art adjuster is set up at the rear end of the body of the headlamp. A bolt is connected with a beam holder for driving a vertical adjusting rod to adjust the angular displacement of the headlamp in up-down and right-left tilting. The main adjusting structure provides for the bolt being joined to a threaded sleeve, one end of the sleeve being fixed to a gear wheel located in a setting space and geared with a crosswise gear. The crosswise gear has a central opening for coupling to an adjusting rod. Displacement of the bolt corresponds to the respective rotary movements of the threaded sleeve, the gear wheel, the crosswise gear and the adjusting rod, to tilt the headlamp at an exact angle.

The structure of the present invention provides a more simple device, which is easier to operate and install, and makes the headlamp adjustment more accurate.

SUMMARY OF THE INVENTION

The present invention provides a setting angle adjuster for a car headlamp. The setting angle adjuster includes an adjuster stand having a crosswise gear holder and a vertical gear holder. A driving gear with an integrally formed adjusting rod is disposed in the vertical gear holder. A bolt is engaged within a threaded sleeve which is in turn coupled to an active gear disposed within the vertical gear holder, and engaged by the driving gear. The openings in the holders are covered by respective slip caps, providing support for the gearing to provide for the accurate adjustment of the car headlamp.

DESCRIPTION OF THE PREFERRED EMBODIMENT

Figure 1:
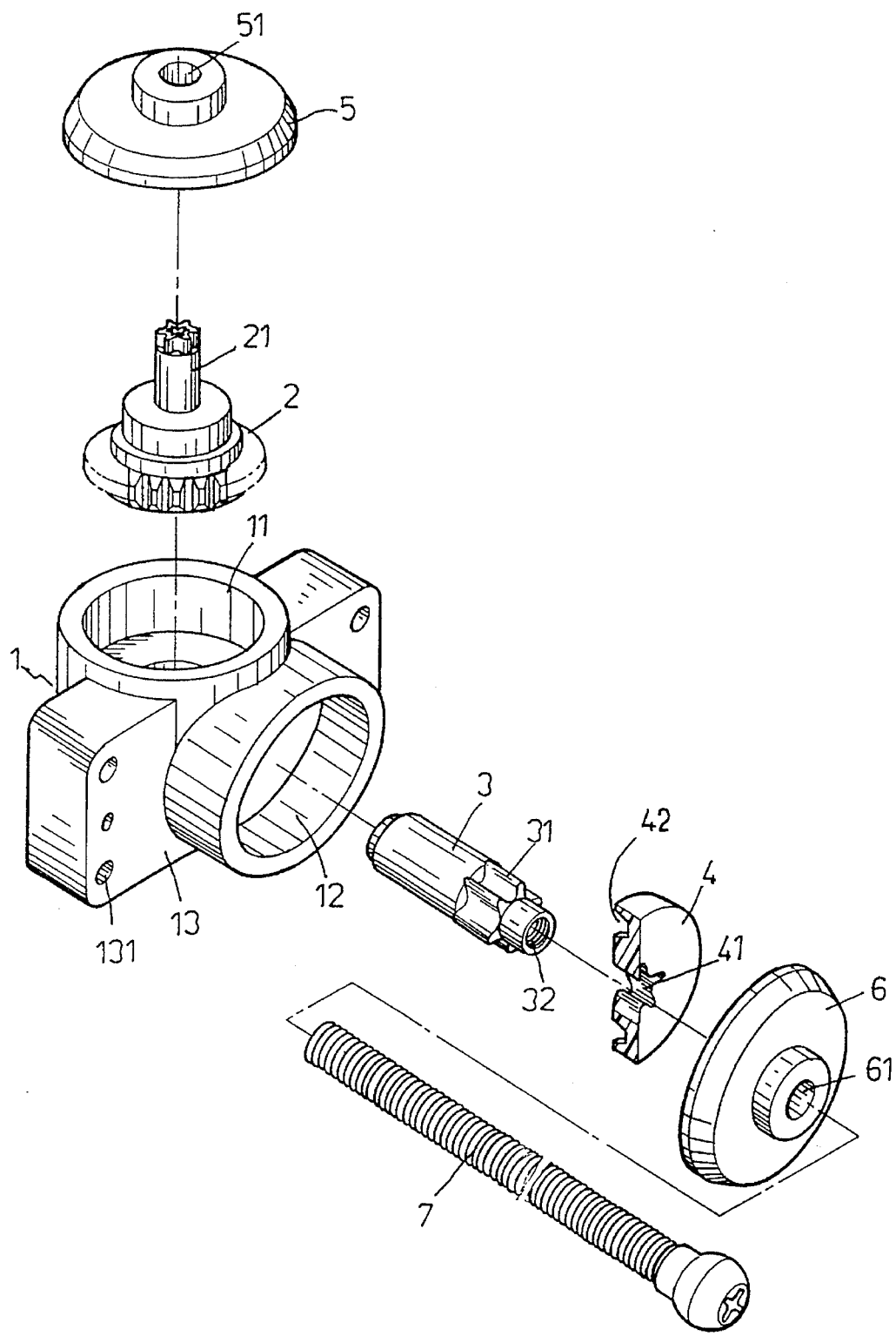
FIG. 1 is an exploded view of the present invention.

Referring to FIG. 1, the headlamp adjuster includes an adjuster stand 1, a crosswise gear 2, a threaded sleeve 3, an active gear 4, two slip caps 5, 6 and a bolt 7.

The adjuster stand 1 has a crosswise gear holder 12 and a vertical gear holder 11 intersecting each other. The adjuster stand 1 also has two blocks 13 disposed on opposing sides thereof, each block having a plurality of holes 131 formed therethrough for fixation to the vehicle.

The driving gear 2 has an adjusting rod extending from the center of one side thereof, the adjusting rod 21 being integrally formed with driving gear 2. The driving gear 2 is disposed within the vertical gear holder 11 of the adjuster stand 1, and covered by the slip cap 5. The adjusting rod 21 extends to the outside through a hole 51 formed through the slip cap 5.

The threaded sleeve 3 has a spline shaped fixture end 31, a thread 32 formed on the inside surface of a through bore formed therein.

The active gear 4 has a splined hole 41 corresponding in shape to the fixture end 31 of the threaded sleeve 3. A circular toothed groove 42 is formed along the circumferential edge of active gear 4, in equal pitch. The active gear is joined to the fixture end 31 of the threaded sleeve 3, within the splined hole 41. The active gear 4 is contained within the crosswise gear holder 12 and covered by a slip cap 6. The bolt 7 passes through the hole 61 of the slip cap 6 to threadedly engage the thread 32 of the threaded sleeve 3.

Figure 2:
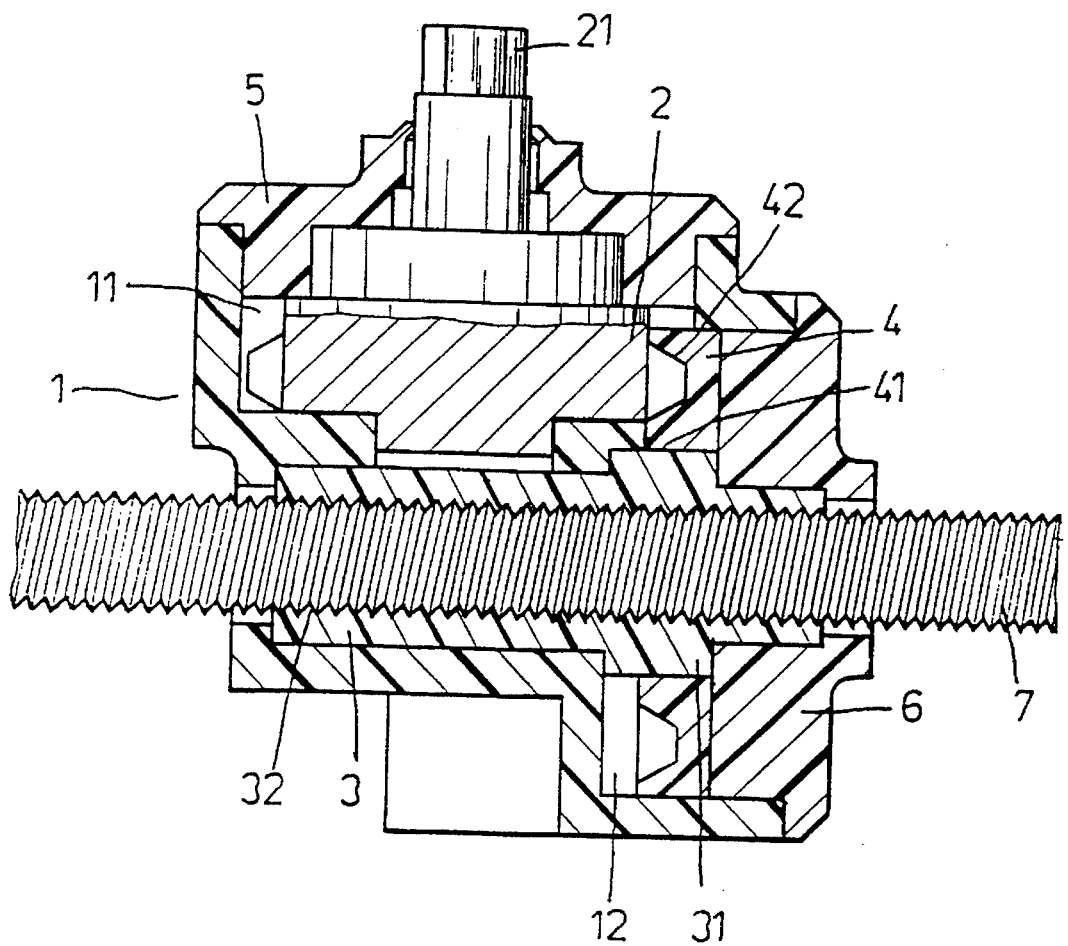
FIG. 2 is a cross-section view of the present invention.
Figure 3:
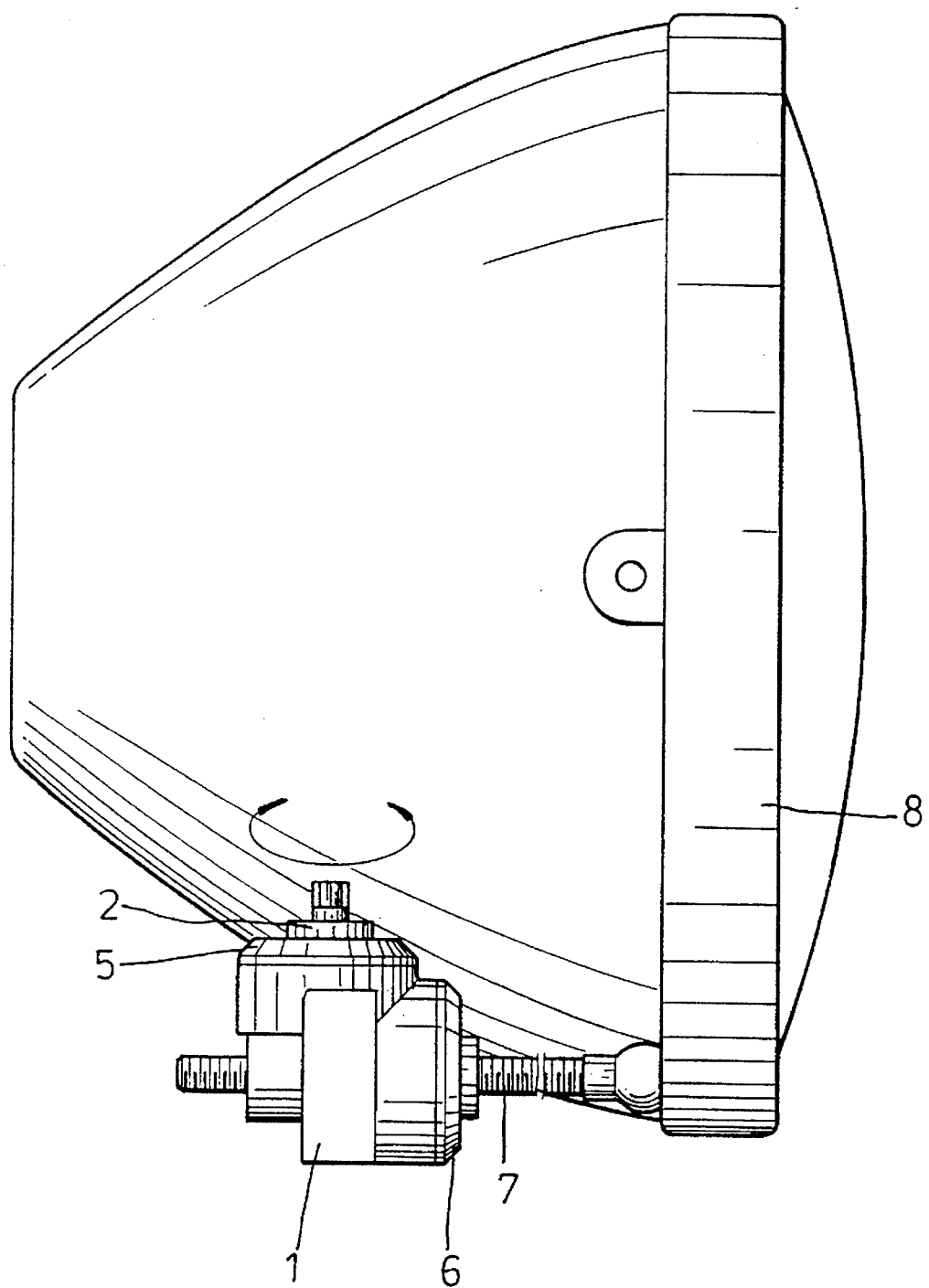
FIG. 3 is a side elevation view showing operation of the present invention; and, FIG. 4 is a conventional setting angle adjuster for a car headlamp.
Figure 4:
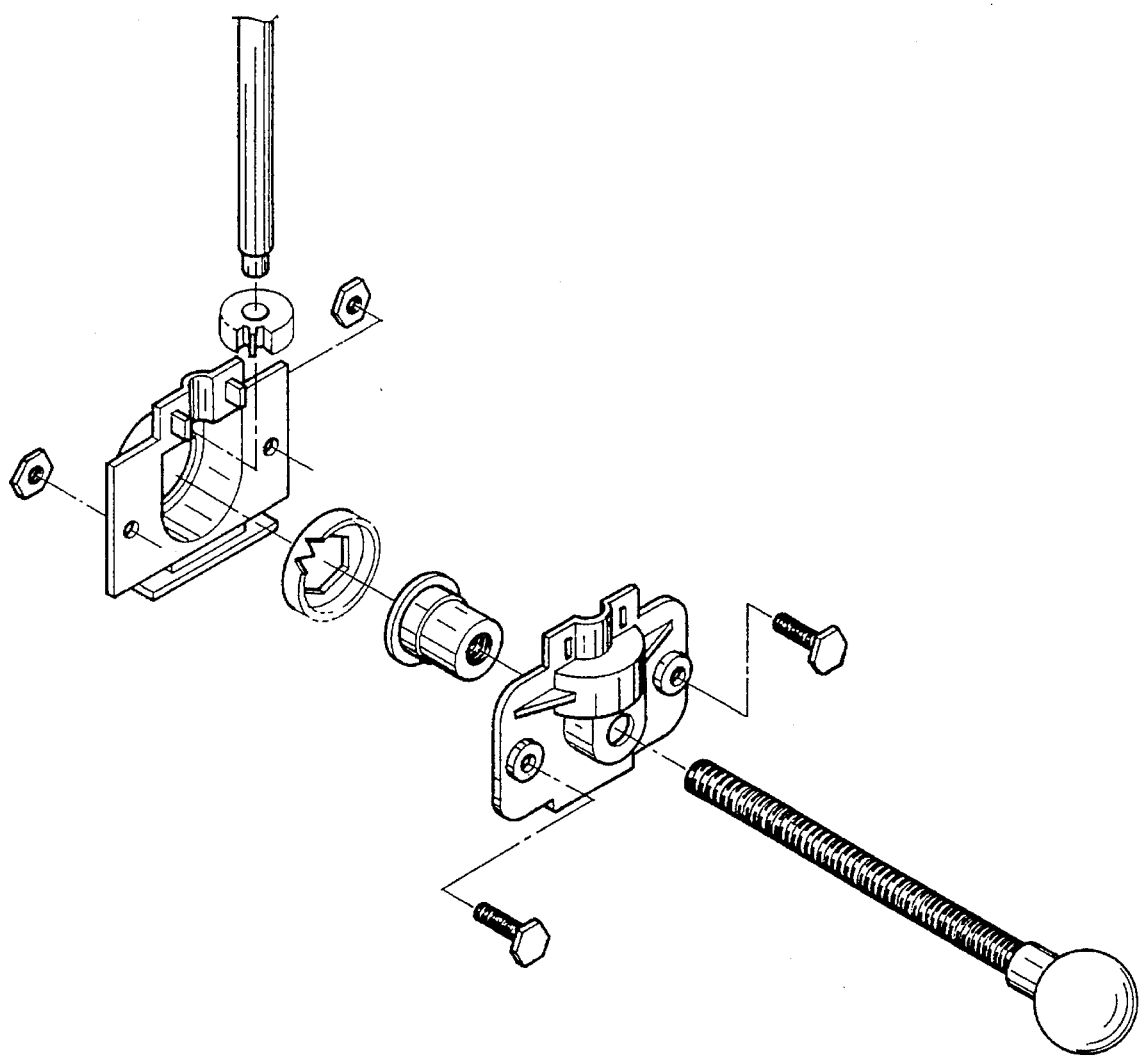

Referring to FIG. 2, the combination of the above-mentioned parts is shown. The gear 2 is disposed in the vertical gear holder 11 of the adjuster stand 1, its teeth engaged in the circular toothed groove 42 of the active gear 4 disposed in the crosswise gear holder 12. Referring to FIG. 3, the operation of the bolt 7 is shown. The bolt 7 is connected to the body of the headlamp 8, and is screwed in or out by rotation of the adjusting rod 21, to drive the headlamp 8 to change the angle to which it is directed, providing the means to adjust the headlamp to an exact angle, for providing good lighting.

What is claimed is:

1. An angle adjuster for a vehicle headlamp, comprising:

an adjuster stand having a pair of mounting blocks disposed on opposing sides thereof, each of said mounting blocks having a plurality of holes formed therethrough, said adjuster stand having a first circular recess formed in an upper surface thereof to define a vertical gear holder and a second circular recess formed in a frontal surface thereof to define a crosswise gear holder, said crosswise gear holder having a portion thereof disposed in open communication with a portion of said vertical gear holder, said adjuster stand having a first through bore extending therethrough coaxial said second circular recess;

a driving gear rotatably disposed within said vertical gear holder, said driving gear having an adjusting rod integrally formed therewith and extending from one end thereof, said driving gear having teeth disposed about a perimeter edge thereof;

a first cap member coupled to said vertical gear holder and overlying said driving gear, said first cap member having a centrally disposed through opening formed therein for passage of said adjusting rod therethrough;

a longitudinally extended sleeve member rotatively disposed within said first through bore, said sleeve member having an externally splined surface formed on one end thereof and a second through bore formed longitudinally therein, said second through bore being internally threaded;

an active gear rotatably disposed within said crosswise gear holder, said active gear having a toothed recess formed adjacent a circumferential edge thereof for engagement with said teeth of said driving gear, said active gear having a centrally disposed splined through opening for receiving said splined end of said sleeve member therein;

a longitudinally extended bolt member threadedly engaged within said sleeve member second through bore for linear displacement thereof responsive to rotative displacement of said adjusting rod; and, a second cap member coupled to said crosswise gear holder and overlying said active gear, said second cap member having a centrally disposed through opening formed therein for passage of said bolt member therethrough.

* * * * *